(12) United States Patent
Bistolas et al.

(10) Patent No.: US 11,176,021 B2
(45) Date of Patent: Nov. 16, 2021

(54) MESSAGING SYSTEMS WITH IMPROVED RELIABILITY

(71) Applicant: Apple Inc., Cupertino, CA (US)

(72) Inventors: Eugene Bistolas, Mountain View, CA (US); Ryan Nielsen, San Francisco, CA (US); Pierre J. De Filippis, Sunnyvale, CA (US); David P. Remahl, Woodside, CA (US); Cristina Formaini, San Francisco, CA (US); Pierre-Olivier J. Martel, Mountain View, CA (US); Lilynaz Hashemi, San Francisco, CA (US); Stephen Lottermoser, San Jose, CA (US)

(73) Assignee: APPLE INC., Cupertino, CA (US)

( * ) Notice: Subject to any disclaimer, the term of this patent is extended or adjusted under 35 U.S.C. 154(b) by 104 days.

(21) Appl. No.: 16/425,642

(22) Filed: May 29, 2019

(65) Prior Publication Data

US 2019/0370154 A1 Dec. 5, 2019

Related U.S. Application Data

(60) Provisional application No. 62/679,901, filed on Jun. 3, 2018.

(51) Int. Cl.
*G06F 9/44* (2018.01)
*G06F 11/36* (2006.01)
(Continued)

(52) U.S. Cl.
CPC ........ *G06F 11/3664* (2013.01); *G06F 9/4887* (2013.01); *G06F 11/3692* (2013.01);
(Continued)

(58) Field of Classification Search
CPC ............ G06F 11/3664; G06F 11/3692; G06F 9/4887; H04L 51/04; H04L 51/08; H04L 51/16; H04L 51/38
See application file for complete search history.

(56) References Cited

U.S. PATENT DOCUMENTS

| 6,795,711 B1 | 9/2004 | Sivula |
| 7,013,351 B2 | 3/2006 | Bracewell et al. |

(Continued)

OTHER PUBLICATIONS

J. Nystad, A. Lassen, A. Pomianowski, S. Ellis, T. Olson, "Adaptive Scalable Texture Compression", High Performanc Graphics, 2012, The Eurographics Association 2012, 10 pages.

*Primary Examiner* — Chat C Do
*Assistant Examiner* — Lenin Paulino
(74) *Attorney, Agent, or Firm* — Womble Bond Dickinson (US) LLP

(57) ABSTRACT

Improved messaging applications are described that use a first set of software to test rendering of a message, and if the test is successful the message is allowed to be presented. In one embodiment, a first set of software can attempt to test the renderability of a message and if the test is successful, the message can be stored in a message database. In one embodiment, the first set of software operates in a separate sandbox from a sandbox for a messaging application which displays the message. The first set of software can operate in a first process which is different than a process in which the messaging application runs.

28 Claims, 8 Drawing Sheets

(51) Int. Cl.
  *G06F 9/48* (2006.01)
  *H04L 12/58* (2006.01)

(52) U.S. Cl.
  CPC .............. *H04L 51/04* (2013.01); *H04L 51/08* (2013.01); *H04L 51/16* (2013.01); *H04L 51/38* (2013.01)

(56) References Cited

U.S. PATENT DOCUMENTS

| | | |
|---|---|---|
| 7,970,841 B2 | 6/2011 | Wang et al. |
| 8,185,912 B1 * | 5/2012 | Leonard .............. G06F 11/3466 |
| | | 719/314 |
| 8,280,197 B1 * | 10/2012 | Foote ........................ G06F 3/14 |
| | | 382/305 |
| 10,547,576 B1 * | 1/2020 | Kaushal .................. H04L 67/06 |
| 2002/0052922 A1 | 5/2002 | Matsuura et al. |
| 2007/0124210 A1 * | 5/2007 | Chiappetti ............ G06Q 20/202 |
| | | 705/21 |
| 2010/0115038 A1 | 5/2010 | McEachern et al. |
| 2012/0303956 A1 * | 11/2012 | Tomkow ................. H04L 51/30 |
| | | 713/168 |
| 2015/0093036 A1 * | 4/2015 | Park ........................ H04N 19/40 |
| | | 382/233 |
| 2015/0200878 A1 * | 7/2015 | Shih ........................ H04L 67/42 |
| | | 709/206 |
| 2015/0347784 A1 * | 12/2015 | Keen .................. G06F 16/2291 |
| | | 726/28 |
| 2017/0359281 A1 * | 12/2017 | Yip ....................... H04L 51/046 |
| 2018/0063091 A1 * | 3/2018 | Lancioni ................. H04L 63/20 |
| 2019/0068916 A1 * | 2/2019 | Arora ............. H04N 21/234309 |

* cited by examiner

MESSAGING SYSTEMS WITH IMPROVED RELIABILITY

This application claims the benefit of priority to U.S. Provisional Patent Application No. 62/679,901, filed Jun. 3, 2018, which application is hereby incorporated herein by reference.

BACKGROUND

The embodiments described in this disclosure relate to messaging systems such as text messaging systems on cellular telephones, smart phones, other communication devices or data processing systems and also relate to other types of messaging systems such as email messaging systems.

The use of text messaging systems began many years ago. For example, wireless cellular telephone carriers, such as Verizon or AT&T, allowed text messages through the Short Message Service (SMS) for cell phones in the 1990s before smartphones were available. Typically, the amount of data transmitted has been limited by rules established by the carriers. Recently, as the use of smartphones (e.g. iPhones) and tablet computers (e.g. iPad) has increased, the text messaging systems have developed the ability to send images, such as photos or emojis. In addition, messaging systems such as iMessage from Apple Inc. of Cupertino, Calif. have allowed users to also send and receive text and images through "public" networks which include "public" WiFi access points and the Internet (in addition to using the wireless carrier's private cellular telephone networks), and messaging systems such as iMessage can seamlessly transition between the use of public and private networks depending on the availability of, for example, WiFi access points or the compatibility of the other user's device (which may not be compatible with iMessage).

Messaging systems can sometimes experience problems due to at least two situations. Firstly, some text messages can include data that, while not malware, can cause the messaging application to crash when the messaging application attempts to display the message. Second, some text messages include malware such as malware in an attachment that is designed to take over a user's device or cause other problems on the device.

SUMMARY OF THE DESCRIPTION

The embodiments described herein operate in a data processing system that includes a messaging application and other software to operate with the messaging application to test messages which are received and test attachments which are received that are part of messages. In one embodiment, a first set of software can attempt to test the ability to render a message and if the test is successful, the message can be stored in a database. In one embodiment, the first set of software can operate in a separate sandbox from a sandbox for a messaging application which displays the message.

In one embodiment, a method can include the following operations: receiving, at a device that includes a messaging application, a message; executing a first set of software to process the message, the first set of software configured to attempt to test its ability to render the message into a displayable content; determining whether the first set of software has successfully tested its ability to render the message into a displayable content; and executing, when the messaging application is executing, a second set of software that operates with the messaging application to display the message in response to determining that the first set of software has successfully tested its ability to render the message into the displayable content. In one embodiment, the first set of software and the second set of software can have the same functionality and perform the same operations; in another embodiment, the first set of software and the second set of software are two instances of the same computer program code. In one embodiment, the second set of software executes while the messaging application is displaying one or more messages in a conversation within a message transcript, and the second set of software renders the message. In one embodiment, the output from the first set of software is not displayed. In one embodiment, the first set of software runs in a first sandbox and the second set of software runs in a second sandbox, and the first sandbox and the second sandbox are different. In one embodiment, the test by the first set of software includes operations that involve making application programming interface calls to graphics software to draw one or more portions of the message for display in a displayable format in containers, such as bubbles, in a message transcript of a conversation. In one embodiment, the first set of software, when it is executing to process the message, also attempts to parse the message into a plurality of portions. In one embodiment, the processing or scheduling priority of the first set of software can be boosted, from a first level to a second level that has a higher priority than the first level, when a number of messages waiting to be processed by the first set of software exceeds a threshold value or when a time period between a current time and a last used time of the messaging application exceeds a specified period of time.

In one embodiment, the first set of software can be a working daemon that is managed by a managing daemon, and the managing daemon can monitor the status of the working daemon and relaunch the working daemon if the working daemon crashes while attempting to test rendering of the message. In one embodiment, it will be determined that the first set of software has not successfully tested its ability to render the message when (1) the working daemon crashes while attempting to test rendering of the message; or (2) one or more exceptions (such as error messages) are thrown by the working daemon back to the managing daemon; or (3) the test is not completed within a period of time. In one embodiment the period of time can be about 20 seconds or 15 seconds, etc. In one embodiment, the managing daemon can have a more entitlements to system resources than the working daemon; for example, the working daemon does not have network access entitlement or file access entitlement in one embodiment while the managing daemon does have network access entitlement and file access entitlement. In one embodiment, the managing daemon causes a successfully tested message to be saved in a messages database but does not save a message that was not successfully tested. The messaging application can be one of an email application or a text messaging application or a web browser application.

In one embodiment, the messaging application can execute in a first sandbox and can have access entitlement to all conversations managed by the messaging application and can have network access entitlement and camera access entitlement and file access entitlement, but the second set of software which renders the message can execute in a second sandbox which is different than the first sandbox and can have fewer entitlements than the messaging application and has access entitlement to the currently open conversation and not to other conversations.

In one embodiment, the messaging application can be configured to transmit short message service (SMS) text messages and other content and display the text messages in message bubbles in a message transcript of a particular conversation.

A method according to another embodiment can include the following operations: receiving, at a device that includes a messaging application, an attachment associated with a message; executing a first set of software to process the attachment, the first set of software configured to attempt to test its ability to render the attachment into a displayable format; executing, when the messaging application is executing and is displaying one or more messages in a conversation, a second set of software to display the attachment in response to determining that the first set of software has successfully tested its ability to render the attachment into the displayable format. In one embodiment, the method can further include the operation of saving the tested attachment that was rendered by the first set of software for use by the second set of software to display the attachment (so that the second set of software may not need to perform at least some rendering operations). In one embodiment, the representation of the saved attachment is used in notifications about receipt of the message, such as notifications on a home screen of the device or data processing system. In one embodiment, the second set of software renders the attachment, and the second set of software has the same functionality and operations as the first set of software. In one embodiment, the first set of software transcodes the attachment into a limited set of displayable formats from a set of receivable formats which is larger than the limited set of displayable formats. In one embodiment, the limited set of displayable formats includes one or more of an ASTC format or a CPBitmap format and the set of receivable formats includes more formats (such as JPG, PNG, etc.) than the limited set. In one embodiment, the second set of software displays a generic icon in place of the attachment in the message transcript when the first set of software does not successfully test the ability to render the attachment.

In one embodiment, the first set of software executes in a first sandbox and the second set of software executes in a second sandbox, where the first sandbox and the second sandbox are different. In one embodiment, the test by the first set of software includes making application programming interface (API) calls to graphics software to draw one or more portions of the attachment in the displayable format, and the second set of software displays the attachment in a message transcript of a conversation. In one embodiment, the attachment is decrypted before being processed by the first set of software. In one embodiment, the first set of software is a working daemon that is managed by a managing daemon, and the managing daemon monitors the status of the working daemon and relaunches the working daemon if the working daemon crashes. In one embodiment, the first set of software is determined to have not successfully tested its ability to render the attachment when (1) the working daemon crashes while attempting to test rendering of the attachment; or (2) one or more exceptions are thrown by the working daemon to the managing daemon; or (3) the test of rendering is not completed within a predetermined period of time. In one embodiment, the managing daemon can have more entitlements to resources in the data processing system than the working daemon, and the working daemon does not, for example, have a network access entitlement and does not have a file access entitlement.

In another embodiment, a messaging system can use a method to monitor, track and mark failures to render one or more messages or attachments in one or more conversations, and this method can ultimately result in the replacement of one or more messages or attachments with a generic placeholder for those messages or attachments that failed to be rendered. In one embodiment of this method, the messaging application monitors one or more attempts by a set of software to render a message or attachment in a conversation at run time of the messaging application. If the set of software fails to render a message or attachment in the conversation, the messaging application can mark the conversation as having at least one message or attachment that could not be successfully rendered during run time of the messaging application; in one embodiment, the marking is at the level of the conversation so there is no identification of the particular message or attachment within the conversation that could not be rendered. The messaging application, in one embodiment, can operate in a first process and sandbox while the set of software can operate in a second process and sandbox that is different than the first process and sandbox so that failures to render within a conversation may crash the set of software but do not effect the messaging application. The failure by the set of software to render a message or attachment can be detected by a monitoring daemon which can detect a failure when the set of software crashes during an attempt to render or takes too long (e.g. a time out) to render or generate one or more error messages during an attempt to render or throws one or more exceptions during an attempt to render. The next time the marked conversation is opened in the messaging application, the set of software can again attempt to render the messages and attachments in the conversation that has been marked; the marking of the conversation can trigger tracking of rendering status within the conversation while the set of software attempts again to render each message and attachment in the conversation. In one embodiment, the messaging application or the set of software or a monitoring daemon keeps track of, on a per message and per attachment basis, the status of the rendering of each message and each attachment within a marked conversation to determine whether the rendering fails. If any one of the attempts to render fail within the marked conversation, the particular message or attachment (that produced the failure to render) is marked to be replaced with a generic placeholder such as generic text or a placeholder icon. When the marked conversation is displayed going forward, the generic placeholder will be displayed and the set of software will not attempt to render any marked message or attachment in the conversation.

The methods and systems described herein can be implemented by data processing systems, such as one or more smart phones, tablet computers, desktop computers, laptop computers, smart watches, wearable devices, audio accessories, onboard computers, and other data processing systems and other consumer electronic devices. The methods and systems described herein can also be implemented by one or more data processing systems which execute executable computer program instructions, stored in one or more non-transitory machine readable media or medium that cause the one or more data processing systems to perform the one or more methods described herein when the program instructions are executed. Thus, the embodiments described herein can include methods, data processing systems, and non-transitory machine readable media such as DRAM memory and flash memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The embodiments are illustrated by way of example, and not limitation, in the figures of the accompanying drawings in which references with like numbers indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
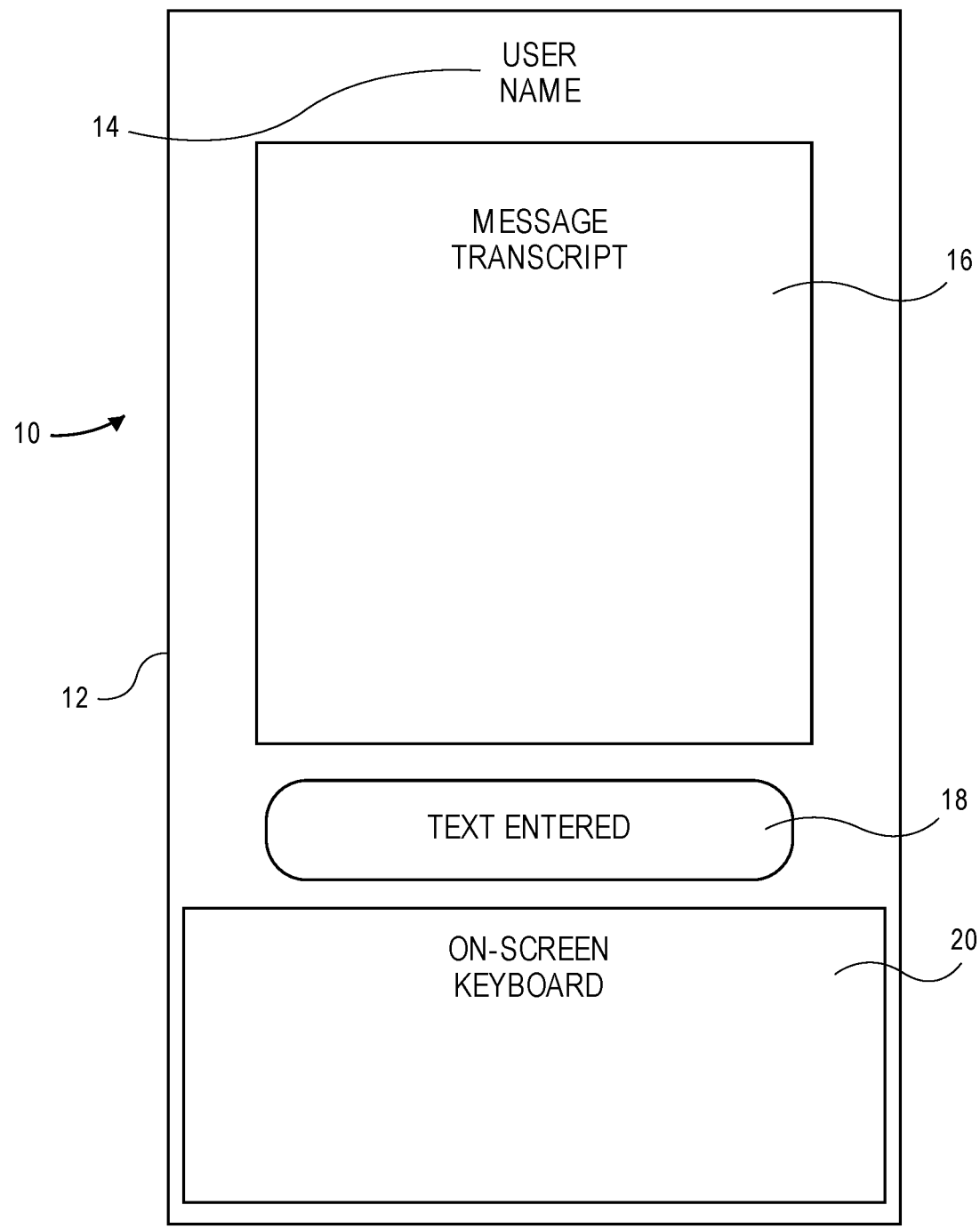
FIG. 1A shows an example of a user interface for a messaging application on a data processing system, such as a smart phone.

The various embodiments described herein relate to messaging systems such as text messaging systems or "chat" messaging systems or other systems which allow devices to communicate messages between the devices. For example, iMessage from Apple Inc. of Cupertino, Calif. is an example of a messaging service for iOS devices and Mac (OS X) computers. Typically, a messaging system includes the plurality of client devices, each including at least one messaging app, and a set of one or more messaging servers that can receive messages from client devices and transmit messages to client devices. FIG. 1A shows an example of a user interface of a messaging app on a client device. The client device can be a communication device 10 which can be a smartphone, or tablet computer, or a desktop computer or a laptop computer, wearable, on-board computer, or other data processing systems or other consumer electronics devices. In one embodiment, the device can include a conventional touch screen that can both display images and also accept touch inputs from a user. The touch screen 12 on the communication device can display the user interface of the messaging app which can include a message transcript 16 and an on-screen keyboard 20 below the message transcript 16. In addition, the user interface of the messaging app can include a user name 14 indicating the recipient, in one embodiment, of messages sent from the communication device 10. In addition, the user interface can include a text entry region 18 which indicates the content of the text entered by the user before it is sent; in a sense, the text entry region 18 is a text staging area indicating text that is ready to be sent to the recipient.

Figure 1B:
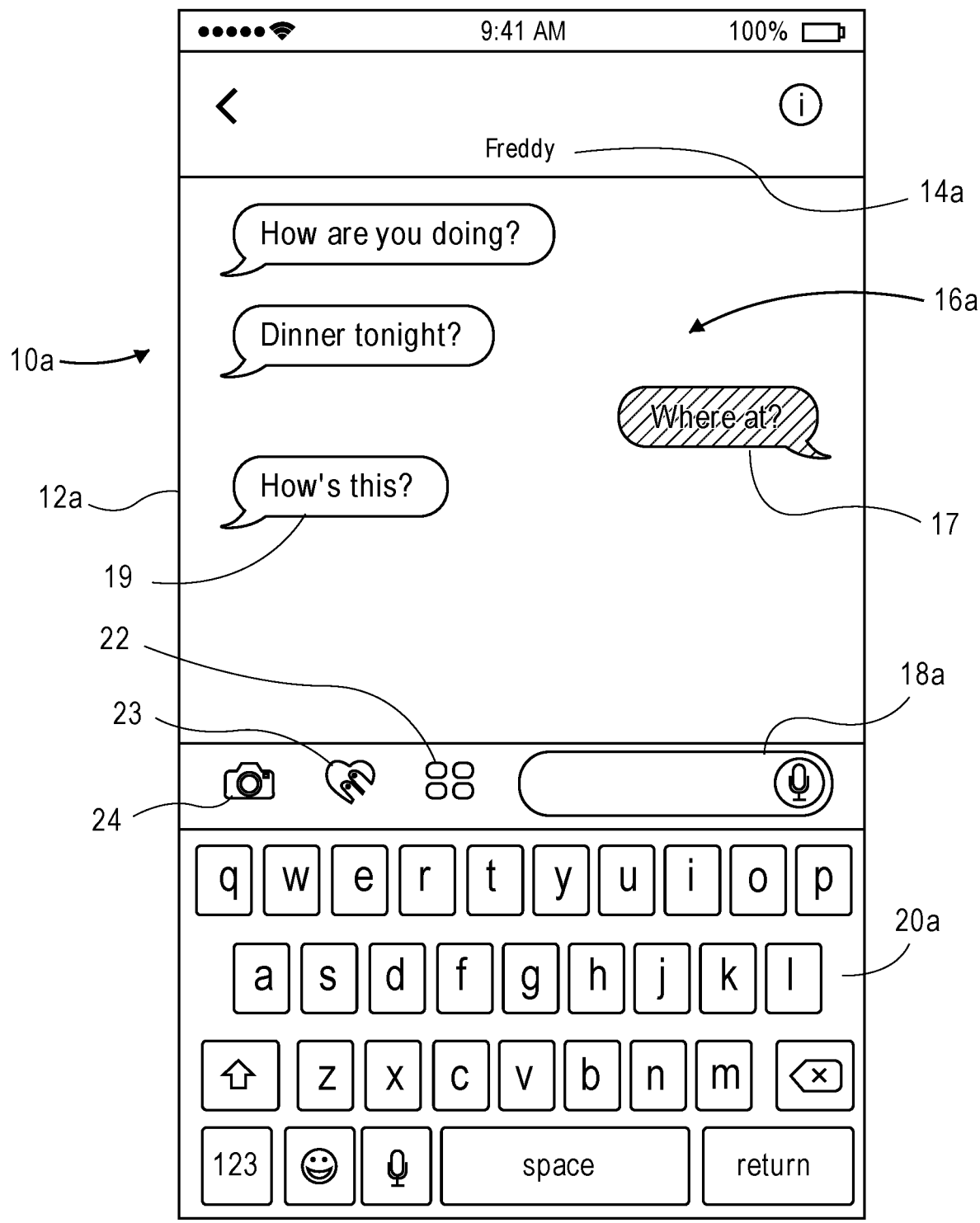
FIG. 1B shows another example of a user interface for a messaging application on a data processing system such as a smart phone.

FIG. 1B shows a more detailed example of a user interface of a messaging app on a communication device 10A. The user interface is displayed in this embodiment on touch screen 12A and includes on-screen keyboard 20A, text entry region 18A, a message transcript 16A and a user name 14A showing the name of the other user(s) to whom messages are sent and from whom messages are received. The text entry region 18A is a staging area for content such as one or more of text, stickers, extension app content, images etc. which are ready to be sent in response to the user's selection of the send command (and in one embodiment, the content can be edited in the staging area). In the example shown in FIG. 1B, messages from Freddy (user name 14A) are shown on the left side of the message transcript 16A and messages sent by the user of communication device 10A are shown on the right side of message transcript 16A. Hence, message bubble 17 shows the message "Where at?" sent by the user of communication device 10A to Freddy as a response to the message from Freddy "Dinner tonight?". The message in message bubble 17 causes Freddy to respond with "How's this?" shown in message bubble 19. The use of the word "bubble", such as message bubble or session bubble, etc. is not meant to imply any specific shape or form; rather it is intended to mean any shape or form of demarcation between messages between two or more participants, and thus the demarcation can use boxes or lines or message containers or different colors, etc. Thus the phrase "message bubble" is meant to cover all such demarcations (or other ways to distinguish) between messages between two or more participants, and particularly in the context of such demarcations or other ways to distinguish in a message transcript. In one embodiment, the message transcript can be scrolled up and down and messages in the message transcript are presented in sequence according to their time, thus the user can see the actual chat or conversation over time by scrolling the view up or down. The user interface shown in FIG. 1B also includes three icons 22, 23, and 24 above the on-screen keyboard 20A and to the left of the text entry region 18A. The extension apps view icon 22, when selected, causes the display of a view of the installed extensions app that can operate with the messaging app, and the view provided can be a browsable view to allow the user to scroll through multiple pages showing all of the installed extension apps that are configured to operate with the messaging app according to the one or more embodiments described herein. The imaging app icon 23 can in one embodiment be an icon that when selected causes the launching of a plugin of the messaging app that provides image creation within the messaging app's process. The camera app icon 24 in one embodiment can, when selected, cause the communication device 10A to enter into a camera mode in which a camera of a device can capture still images or video images which can be placed into the message in order to send the image or video.

Figure 2:
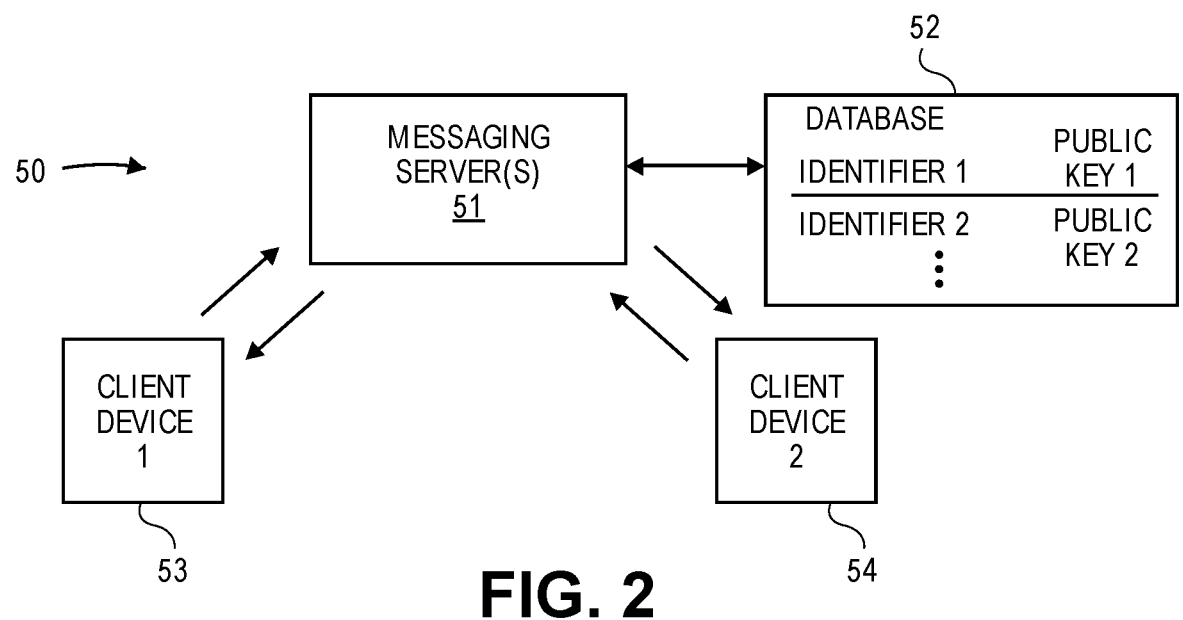
FIG. 2 shows an example of a messaging system which employs one or more messaging servers to provide a messaging service to a set of client devices.

A brief overview of an example of a messaging system will now be provided in conjunction with FIG. 2. A messaging system 50 can include a plurality of client devices, such as client devices 53 and 54. Each of these client devices can include at least one messaging app that is configured to operate with extension apps according to the one or more embodiments described herein and also communicate at least text messages and optionally resource locators or images or other content for devices that are not compatible with the extension app architecture in a messaging app. In a typical messaging system, there can be millions of client devices communicating through a set of messaging servers. In one embodiment, a plurality of messaging servers can be configured to receive encrypted messages from sending devices and then transmit those encrypted messages to the receiving devices. Another set of servers can be configured to receive non-text content, such as images or other "attachments" and provide those images or attachments in download operations to receiving devices in response to requests from those receiving devices to obtain the images or attachments. In one embodiment, a sender's outgoing message is individually encrypted for each of the receiver's devices. In one embodiment, an asymmetric RSA encryption algorithm can be used to perform the encryption. In one embodiment, the public RSA encryption keys of each of the receiving devices can be retrieved from a directory service (maintained by the one or more messaging servers) which includes a database, such as a database 52 which is coupled to the one or more messaging servers 51. When a client device, such as client device 53 seeks to send a message to another client device, it identifies the other client device (such as by an email address or a telephone number or other identifier) to the one or more messaging servers 51. That identifier is sent from the client device, such as client device 53 to one or more messaging servers 51 which then perform a lookup operation in the database 52 based upon the supplied identifier to retrieve the public key that corresponds to that identifier. That public key is then transmitted back to the client device which requested the public key for that particular receiving device, and then the client device can encrypt the message using the public key or using another key (e.g. a symmetric key) which can be randomly generated, and that other key is encrypted with the public RSA encryption key for the particular receiving device. In one embodiment, the randomly generated key can be randomly generated on a per message basis. In one embodiment, the resulting messages, one for each receiving device, consists of the encrypted message text, the encrypted message key, and the sender's digital signature, and this resulting message for each receiving device is then uploaded to the one or more messaging servers 51 for delivery to the recipient client devices, such as client device 54. In one embodiment, the messaging system 50 can be configured to operate through "public" networks which include public WiFi access points (such as WiFi access points in coffee shops, airports, etc.) and also the Internet. The messaging apps on each of the client devices 53 and 54 can also be configured to operate with the "private" networks provided by wireless cellular telephone carriers, such as Verizon and AT&T, and the messaging apps can be configured to seamlessly switch between the use of the private and public networks depending upon the availability of each and also depending upon the compatibility of each of the client devices in a messaging session. In one embodiment, the messaging servers 51 can include a set of push notification servers which receive the uploaded text messages and which "push" those text messages to receiving devices.

The embodiments described herein can eliminate or reduce denial of service problems that occur when a messaging application fails to render content, such as text, of a message even if the content is not malware or not malicious. Also, the embodiments described herein can reduce or eliminate malicious attacks due to malware that can be included in or part of a message such as malware in an attachment such as an image associated with a message. The embodiments described herein can employ multiple separate components of software that can operate in separate processes and in separate sandbox environments. The embodiments described herein can be used in different types of messaging systems including, for example, text messaging systems such as short message service systems, email systems, and web browser based systems.

A method according to one embodiment will now be described while referring to FIG. 3. In operation 301 of FIG. 3, a message can be received. This can occur as a result of downloading the message from a messaging server or service in one embodiment. A client device can download the message from one or more servers using techniques known in the art, and these techniques can be performed as background operations even if the messaging application is not executing at the time of the downloading of the message. The message may have multiple components that come from the same server or from a set of servers in one embodiment. Once the message is received, it can be decrypted in operation 303 if the message is encrypted. In one embodiment, the message and attachments can all be encrypted while in other embodiments the message may be encrypted while attachments are not or in other embodiments nothing is encrypted. After the message has been received (and decrypted if it was encrypted), a first set of software can be launched in operation 305. In one embodiment, the first set of software can be a daemon (such as a working daemon) that operates in the background as a background process. The first set of software can be launched in response to the receipt of the message or can be running as a background process which is launched upon boot up of the device in one embodiment (and hence the first set of software can be an idle background process when the message is received in operation 301). The first set of software attempts to test an ability to render, for example draw, the message; in one embodiment, the first set of software can employ the same set of algorithms and techniques as another set of software, such as the second set of software used in operation 319 to be described further below. In one embodiment, the test is not required to render a final image defined by per pixel data but rather the test performs enough processing on the input data to confirm that the message is capable of being rendered by the second set of software. In one embodiment, the first set of software and the second set of software can be literally identical software, and in this case the first set of software can be considered an instance of the second set of software. The identity between the two sets of software can ensure that the first set of software will detect when the second set of software will fail to render a message. The second set of software can be used at runtime of the messaging application to display the message. Alternatively, in another embodiment while the second set of software may not be identical to the first set of software, the first set of software can perform the same operations and have the same functionality with respect to rendering of the message in such a way that it can still reliably test the ability of the message to be rendered in the same way (as the second set of software) to verify that the second set of software will perform its operations to successfully render the message.

After the first set of software has been launched, it can then attempt to test whether the message can be rendered. In one embodiment, the first set of software can first attempt to parse the content in operation 307 of the message. In one embodiment, operation 307 can be optional, while in another embodiment operation 307 is used in order to verify that the second set of software will be able to parse the message. The parsing in one embodiment can involve detecting different portions of the message such as text portions, photo or image portions, links, such as URL links, etc. In one embodiment, if the first set of software fails in its attempt to parse the message, then the message will not be successfully rendered during run time of the messaging application and operation 313 will produce a result in which processing proceeds to operation 315 as further described below. If the first set of software successfully parses the content of the message in operation 307, then processing can proceed to operation 309. In the example shown in FIG. 3, operation 307 precedes operation 309 while in an alternative embodiment, the order of the operations can be reversed. In operation 309, the first set of software attempts to test the ability of the system to render the content of the message. In one embodiment, the first set of software can make one or more attempts to test the rendering the content as part of operation 309. The attempts to test by the first set of software can include application programming interface (API) calls to graphics software, such as graphic software libraries that generate graphics data for display. For example, these API calls to graphics software can be used to draw one or more portions of the message for display in a displayable format. In one embodiment, these calls can be the same calls which will occur when the second set of software renders the message in a user interface of the messaging application which displays a conversation in a message transcript. In one embodiment, the output from the first set of software (if the message is successfully rendered) is not saved and is not used to display the message; in another embodiment, the rendered output from the first set of software can be saved and used to display the message when the messaging application causes display of the message in operation 319 which will be described further below.

A successful test (by the first set of software) of the ability to render a message (or an attachment) does not, in one embodiment, need to produce pixel data for a portion of a frame buffer in order to confirm that the message (or attachment) will be successfully rendered (e.g., by the second set of software) at run time of the messaging application. In other words, in one embodiment, the testing process performed by the first set of software (e.g., in operation 309 of FIG. 3) can produce a set of data that is used to generate pixel data and that set of data is sufficient to confirm that the message (or attachment) will be successfully rendered (e.g., by the second set of software) at run time of the messaging application. For example, if a Gouraud shading algorithm is used to generate pixel data, the set of data can be pixel values at only vertices of a shape (e.g., a polygon) or pixel values at only boundaries of a shape along a scan line of pixels, and hence the set of data does not need to include all pixels values but can still confirm that enough data has been produced to allow the messaging application, at run time when displaying a conversation, to render the message (or attachment). Other known graphics algorithms also possess this property so there is, in one embodiment, no need to produce all of the pixel data for the message (or attachment) when the first set of software performs the testing process. Moreover, some algorithms may not require any pixel data to be generated in the testing process and yet sufficient data can be generated in the testing process (even with the absence of any pixel data such as color values) to confirm that the messaging application (e.g. the second set of software) will be able to render the message during run time of the messaging application when the conversation is displayed.

While the first set of software performs operations 307 and 309, the data processing system can monitor the status of the first set of software in operation 311. This monitoring of the status of the first set of software can be performed by another software component such as an operating system software component or a daemon software component, such as a managing daemon described herein. The daemon software component can receive heartbeat messages or use other techniques known in the art to monitor the status of the first set of software. The monitoring in operation 311 can be used to determine if the message was successfully tested in operation 313. A successful test in one embodiment indicates that the second set of software will be able to render the message at run time of the messaging application. The monitoring can include the use of a timer to determine whether the first set of software has timed out or is otherwise taking too long to process the message, which indicates a failure in the test of the rendering process. In one embodiment, the timer can count down from a period of time such as 10 seconds or 20 seconds, etc. to determine whether or not the first set of software is taking too long to test rendering the content of the message. The monitoring in operation 311 can also determine whether the first set of software has crashed or whether the first set of software has produced error messages such as exceptions which are thrown or generated by the first set of software and detected by a monitoring daemon or other software component. Operation 313 can in one embodiment determine the test of rendering the message was successful if the first set of software does not crash and it does not throw exceptions and it does not time out. In one embodiment, operation 313 can determine that the test of rendering the message was not successful when the first set of software does crash or the first set of software does throw exceptions or otherwise generate error messages which are detected by the monitoring system or the first set of software times out in that it does not complete the process of testing of the rendering of the message in a predetermined period of time for example. If operation 313 determines that the test of rendering of the message was not successful, then processing proceeds to operation 315. In one embodiment, in operation 315, the message is deleted and is not saved and there is no notice given to the user that the message was deleted. In effect, the message disappears and does not leave a trace; in this case, other devices of the same user will have to perform operations 301, 303, 305, 307, 309, 311, and 313 again in order to determine that the message cannot be successfully rendered by the messaging application and does not use the benefit of the prior performance of the method shown in FIG. 3 on another of the user's devices. In another embodiment, the message can be deleted but the system creates a record of the deleted message, and this record can be used on other devices of the same user. For example, the record can identify the message and the identity of that message can be used on other devices of the same user to avoid processing the message again. In one embodiment, multiple devices of the same user can synchronize with each other either directly or through a server in a cloud storage service, such as iCloud, and this synchronization can provide the record of deleted messages and allow each device to avoid processing the message again. In another embodiment, the record can be provided to a centralized service which can notify devices of other users to avoid attempting to render the message on those other devices of other users.

If the system determines in operation 313 that the test of rendering the message was successful, then the message can, for example, be saved in a messages database in operation 317. In an alternative embodiment, messages which failed the test of rendering can be saved in operation 317 but not displayed and there is no attempt to render those messages in the messaging application. In one embodiment, operations 301, 303, 305, 307, 309, 311, 313, 315, and 317 can be performed as background operations and can be executing even if the messaging application is not executing and has not been launched. These operations can be performed repeatedly in the background as each message is received in background operations, and each successfully rendered message can be saved in for example a messages database which is used by a messaging application when the messaging application is running. In one embodiment, a processing or scheduling priority of the first set of software can be boosted, from a first level to a second level that has a higher priority than the first level, when a number of messages waiting to be processed by the first set of software exceeds a threshold value or when a time period between a current time and the last time that the messaging application was used exceeds a specified period of time. For example, if the user turns the device off for a one-week period of time (for example, the user is on vacation), and the number of messages as a result of the device being off for an extended period of time increases dramatically, the priority of the processing by the first set of software can be boosted, even though it can be implemented as a daemon software component. The boosting of the priority of the first set of software causes it to be run with a higher priority in the data processing system so that it can complete processing of a large set of messages which are waiting to be processed in a faster period of time. In one embodiment, the boosting of priority when the time period between a current time and the last time (that the messaging application was used) can occur without regard to the number of messages which are waiting to be processed by the first set of software.

After the message has been saved in operation 317, a second set of software can perform operation 319. In one embodiment, the second set of software is software that is part of or used by a messaging application when messages are displayed by the messaging application at run time of the messaging application. In one embodiment, the messaging application can cause the launching of the second set of software when the messaging application is launched. In one embodiment, the second set of software can be software code which is native within the messaging application and is part of the messaging application and is used to display messages in one or more message transcripts of a conversation. In another embodiment, the second set of software can be part of a messaging lite application which is created and is used to process a current conversation while the messaging application provides overall control of the user interface and has access to all of the conversations in the messaging system. This is described further below in conjunction with FIG. 4. In one embodiment, the second set of software can render the message to generate pixel data for display by performing the rendering operations even though the message was previously processed to determine renderability by the first set of software; in this case, the rendered version of the message was not stored but rather underlying data used to render the message was stored. In an alternative embodiment, the second set of software can retrieve a stored version of the rendered message which was saved in addition to saving the underlying data of the message in operation 317.

Figure 3:
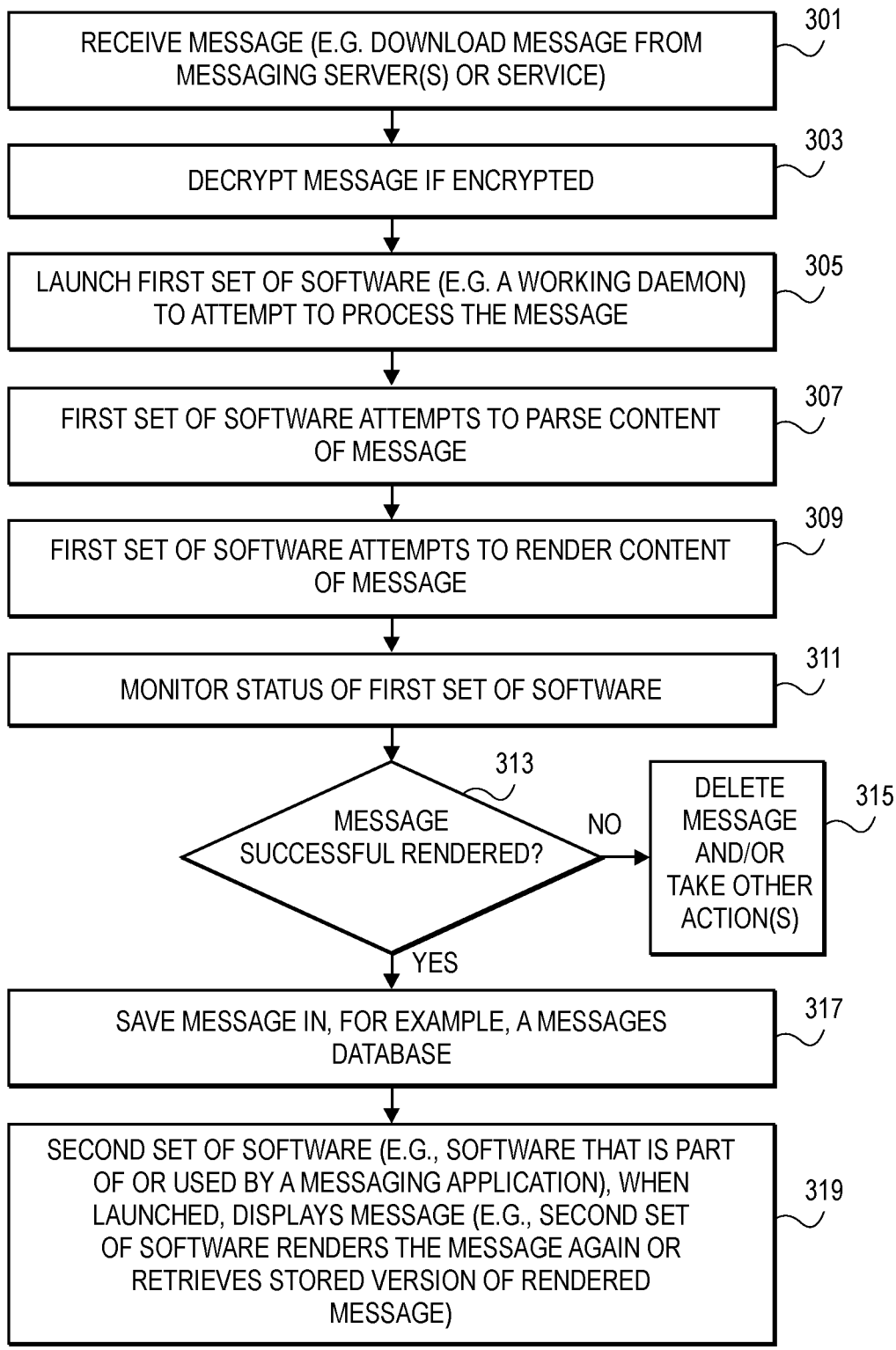
FIG. 3 is a flowchart which illustrates a method according to one embodiment described herein.
Figure 4:
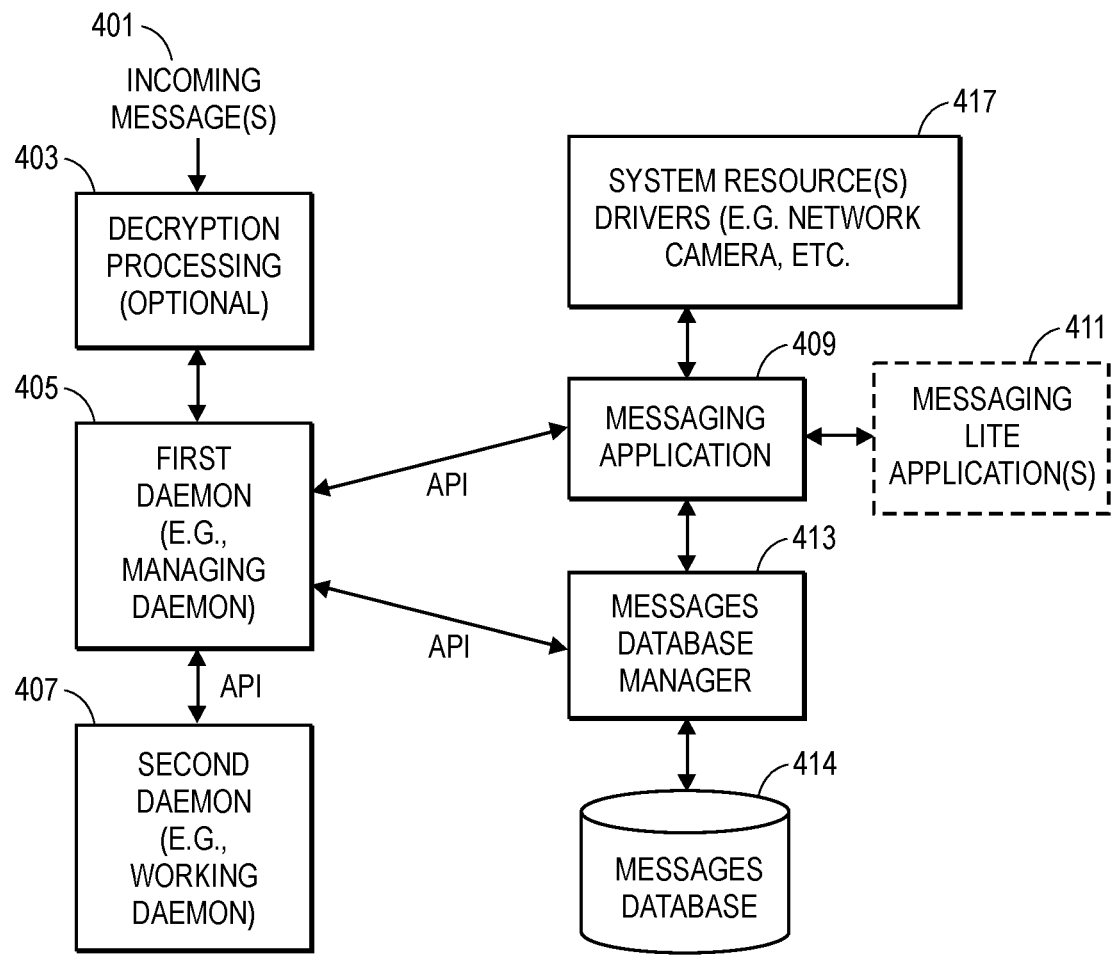
FIG. 4 shows an example of a software architecture according to one embodiment.
Figure 5:
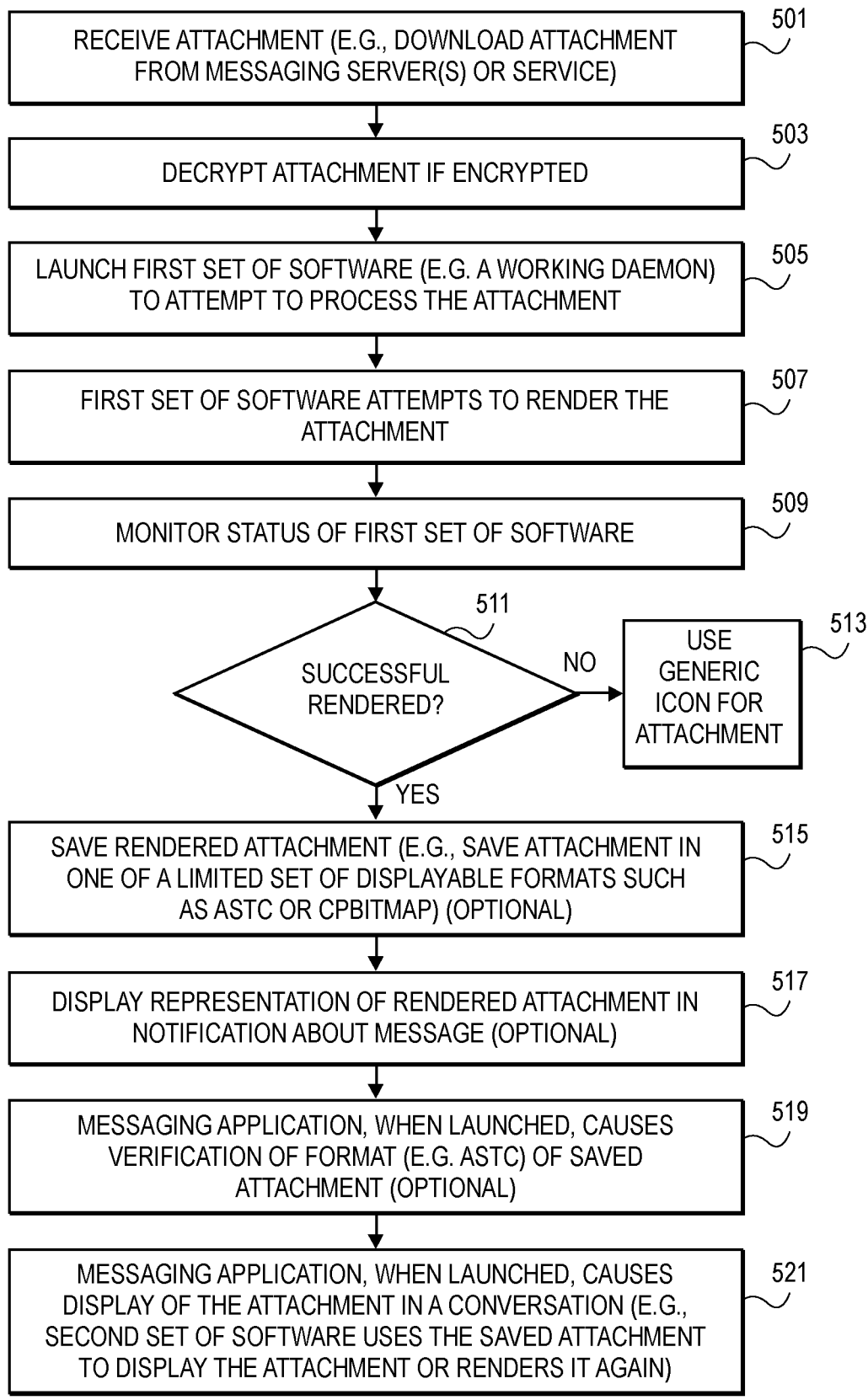
FIG. 5 is a flowchart which illustrates a method according to another embodiment described herein.

FIG. 4 shows an example of a data structure which can include software and data which can implement one or more embodiments described herein including the methods shown in FIGS. 3 and 5. In one embodiment, the data structure can be stored in memory in a data processing system, and the memory can be coupled to a processing system in the data processing system. For example, the daemon 407 can be the first set of software which performs operations 307 and 309 in FIG. 3 and can also be the first set of software which also performs operations 505 and 507 in FIG. 5. In one embodiment, the daemon 407 can be thought of as an instance of the software code in the messaging application (or software code used by the messaging application) that tests the renderability of the text of a message in a message bubble in a message transcript of a conversation, and the instance is a literal copy of that software code so that it can reliably test whether the content of the text message can be successfully displayed by the messaging application during runtime of the messaging application. The daemon 405 can be a managing daemon which performs the monitoring of the status of the first set of software in, for example, operation 311 of FIG. 3 and operation 509 of FIG. 5. The messaging application 409 can be the messaging application (such as a text messaging application) which can perform operation 319 in one embodiment and which can also perform operation 521 shown in FIG. 5 in one embodiment. The message which is saved in operation 317 can be saved by the messages database manager 413 into the messages database 414 shown in FIG. 4. Also, the rendered attachment which is saved in operation 515 in FIG. 5 can be saved in the messages database 414 through operations of the messages database manager 413 shown in FIG. 4. An incoming message 401 as shown in FIG. 4 can be received by decryption processing module 403 which is optional in one embodiment. The decryption processing module 403 decrypts the incoming message 401 and provides the incoming message 401 to the daemon 405 which in one embodiment can be a managing daemon that manages the daemon 407 shown in FIG. 4. In one embodiment, the daemon 405 communicates with the daemon 407 through an API through which actions can be passed back and forth between the daemon 405 and the daemon 407. For example, the daemon 405 can instruct the daemon 407 to process a message or attachment and can instruct the daemon 407 to respond back indicating success or failure or can respond back with error messages or exceptions for example. In addition, the daemon 405 can monitor the status of the daemon 407 while it attempts to process the message or attachment in one embodiment. In one embodiment, the daemon 407 can be a copy of literally the same code that is part of or is used by the messaging application 409 to render the message or attachment when the messaging application is displaying the message in a message transcript of a conversation. In one embodiment, the first daemon 405 can relaunch the daemon 407 should the daemon 407 crash while attempting to test the ability to render a message or attachment. In one embodiment, the daemon 405 and the daemon 407 and the decryption processing module 403 run as background processes and are launched at boot time of the device or data processing system so that they are available to run as background processing operations any time an incoming message, such as incoming message 401 is received. Moreover, in this embodiment, the messages database manager 413 can also run as a daemon in background processing and also be launched at boot time of the data processing system. In one embodiment, there is only one instance of the daemon 407 and it is managed by a single instance of the daemon 405, and the daemon 405 will relaunch the daemon 407 should it crash or otherwise fail when testing a message or attachment and needs to be relaunched.

In one embodiment, an application programming interface can exist between daemon 405 and the messages database manager 413. In one embodiment, this application programming interface can provide for operations such as one or more save operations in which incoming messages are saved through calls of the API into the messages database 414. For example, a message or attachment which is determined to be renderable as a result of a successful test of the ability to render can be saved through a call through this API into the messages database 414. Also in one embodiment, an application programming interface can exist between daemon 405 and messaging application 409 in order to allow the messaging application 409 to control the daemon 405 and to set up daemon 405 for new or modified messaging accounts or for other purposes.

Figure 6:
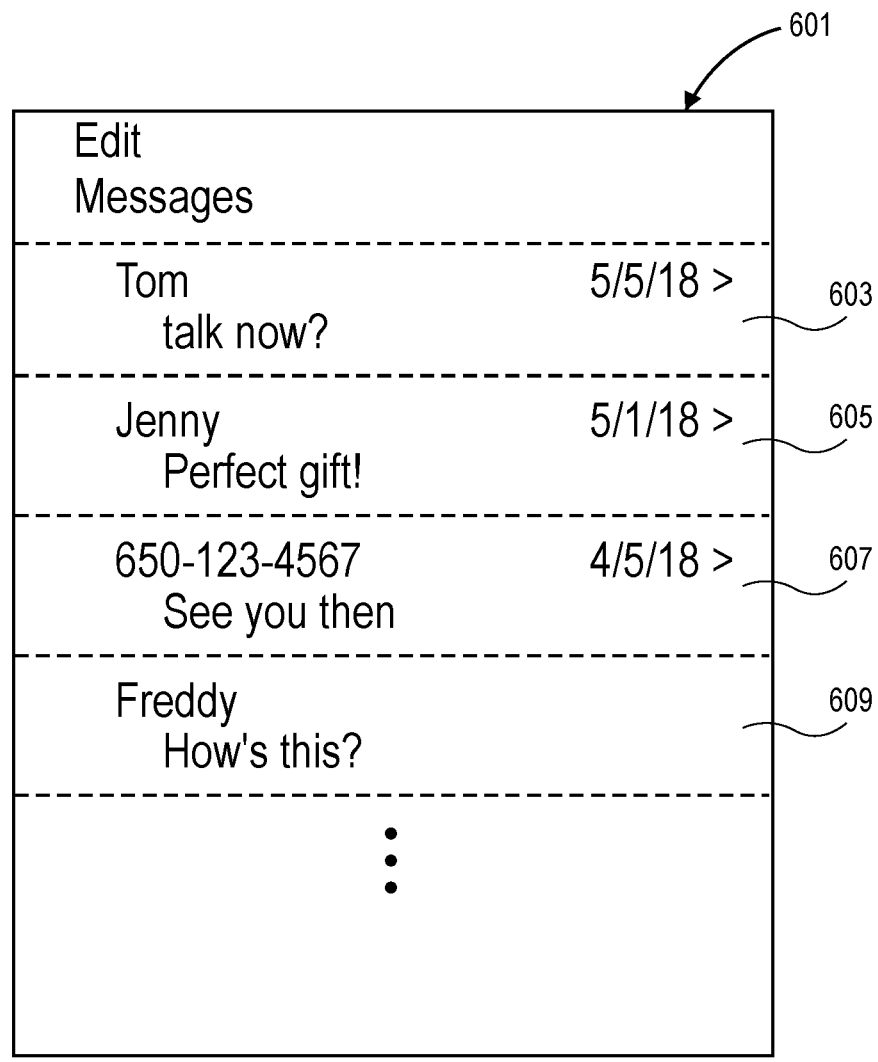
FIG. 6 shows an example of a user interface which displays a plurality of conversations managed by a messaging application.

In one embodiment, messaging application 409 can control the overall display of messages and can receive messages stored in the messages database 414 through the operations of the messages database manager 413 and can cause display of messages in a message transcript for the current conversation. FIGS. 1A and 1B show examples of a user interface of a messaging application, such as messaging application 409. The messaging application 409 can receive user inputs to display messages and respond to messages and create new messages and switch between conversations in the messages. In one embodiment, the messaging application 409 can process messages or cause other software applications or software components, such as an optional messaging lite application(s) 411 to process the messages. In one embodiment, the messaging application 409 can process messages itself and thus the second set of software in the methods shown in FIGS. 3 and 5 is part of the messaging application 409. In another embodiment, the messaging application can use another component of software, such as the messaging lite application 411 to process the messages, and in this embodiment the second set of software is part of the one or more messaging lite applications 411. In one embodiment, the messaging lite application 411 can be a portion of the software of the messaging application 409, which portion is configured to provide certain predetermined functionality which is provided as a service to the messaging application 409. For example, the messaging lite application 411 can render messages and render attachments and perform other operations for the messaging application 409. In one embodiment, the messaging application 409 operates in a first sandbox while the messaging lite application 411 operates in a second sandbox which is different than the first sandbox. Moreover, the messaging application 409 can operate as a first process which is separate from a second process in which the messaging lite application 411 operates. The separation of the messaging application 409 and the messaging lite application 411 can provide security as is known in the art. For example, these different sandboxes with different entitlements in one embodiment provides an added level of security. Further details in connection with use of different sandboxes for different applications can be found in U.S. Pat. No. 9,361,454 which is hereby incorporated herein by reference in this disclosure. In one embodiment, the daemon 405 can be in a sandbox by itself and daemon 407 can also be in a sandbox by itself such that each of these daemons operates within separate sandboxes which are separate from the sandboxes for messaging application 409 and the messaging lite application 411. In one embodiment, the messaging lite application 411 can be an instantiation of a portion of the messaging application 409 which has been instantiated to process the particular and current conversation which is being displayed by the messaging application 409. In one embodiment, the messaging lite application 411 is a single instantiation of a portion of the messaging application 409 which is been instantiated to process only the current conversation that is being displayed. It will be appreciated that a conversation is one of a plurality of conversations in a messaging application in one embodiment. This is shown in FIG. 6 in which the user interface 601 of the messaging application, such as messaging application 409, shows a plurality of conversations 603, 605, 607, 609, and potentially other conversations. The conversation 609 can be the conversation shown in FIG. 1B in which Freddie and the user of the device are engaged in the conversation through the messaging application such as messaging application 409. Thus, in one embodiment, the daemon 405 can operate with in its own sandbox which is separate and distinct from the sandbox for the daemon 407. Moreover, the messaging application 409 can run within its own sandbox which is separate and distinct from the sandboxes of the daemon 405 and the daemon 407. Further, the messaging lite application 411 can operate within its own sandbox for its processes, and the sandbox for the messaging lite application 411 can be separate and distinct from the other sandboxes described herein. In one embodiment, each of these sandboxes can be configured with different entitlements to system resources, such as system resources managed by drivers 417 shown in FIG. 4. For example, in one embodiment, the messaging application 409 may have access entitlements to network resources and to camera resources on the device and to other resources on the device while the messaging lite application 411 does not have such access entitlements. In one embodiment, the messaging lite application 411 may have access entitlements to only the current conversation and not other conversations that are managed by messaging application 409, while the messaging application 409 has access entitlements to the network interfaces, camera, file access, and all of the conversations managed by the messaging application 409. In one embodiment, the daemon 405 has more entitlements to resources in the data processing system than the daemon 407, and the daemon 407 does not have a network access entitlements and does not have a file access entitlement. In one embodiment, the second set of software referred to in FIGS. 3 and 5 has a restricted set of entitlements relative to the daemon 405 and the messaging application 409. For example, the second set of software in one embodiment does not have file access entitlements and does not have network access entitlements and has access entitlements to only the currently opened conversation and not to other conversations managed by the messaging application 409.

FIG. 5 shows an example of a method according to one embodiment in which attachments to messages can be processed. In operation 501, an attachment can be received through, for example, a download operation of the attachment from one or more servers of the messaging system. If the attachment is encrypted, then in operation 503 the attachment can be decrypted. After decrypting the attachment in operation 503, a first set of software, such as a working daemon, can be launched in operation 505 to attempt to process the attachment. In one embodiment, the first set of software can be the daemon 407 shown in FIG. 4 and can also be the first set of software which was used in the method shown in FIG. 3. Then in operation 507, the first set of software can attempt to test the renderability of the attachment. The process of attempting to test the renderability of the attachment can include one or more API calls to graphics software to test drawing of the attachment. The test of drawing or rendering of the attachment in one embodiment can be in the context of a message transcript of a conversation in a messaging application. For example, the context can include specific attributes about the size of a bubble or other container in a message transcript of the conversation. While operation 507 occurs, in one embodiment, the status of the first set of software can be monitored in operation 509. Operation 509 can be similar to operation 311 described above and can utilize a managing daemon, such as daemon 405 shown in FIG. 4 to monitor the status of the first set of software. The monitoring of the status of the first set of software can include the use of, for example, heartbeat messages from the first set of software and the detection of other messages through, for example, an API between the first set of software and the managing daemon. The monitoring of the status of the first set of software in operation 509 can further include the use of a timeout feature through a timer managed by the managing daemon to determine whether or not the first set of software has taken too long to test the rendering of the attachment. In operation 511, it is determined whether or not the testing of the rendering has been successful. In one embodiment, the testing of the rendering is not successful if the first set of software has crashed or has taken too long (a timeout occurred) or has thrown one or more exceptions or generated one or more error messages detected by the monitoring of the status of the first set of software. If the testing of the rendering is not successful, operation 513 follows operation 511, and in operation 513 it is determined that a generic icon will be used for the attachment to indicate that an attachment was present but that it failed the test of renderability. If the test of rendering is successful as determined in operation 511, processing proceeds to operation 515.

In operation 515, the system saves the rendered attachment in one of a limited set of displayable formats rather than all possible formats which can be received in a message. This operation 515 is optional in one embodiment. In an alternative embodiment, the rendered attachment is not saved and the messaging application (for example through the second set of software) renders or causes the rendering of the attachment. The saving of the rendered attachment in a limited set of displayable formats can require a transcoding operation to occur in which a displayable format in one format, such as JPEG, or PNG or other image formats is transcoded into one of the limited set of displayable formats such as the ASTC (Adaptive Scalable Texture Compression) format. For example, the limited set of displayable formats can be a number of formats which is smaller than the number of all possible formats which can be received in or as part of or related to a message. In one embodiment, the limited set of displayable formats can be the ASTC format and the CPBitmap format. In one embodiment, by limiting the number of displayable formats through the transcoding operation (in which one format not in the limited set is transcoded to a format in the limited set), it is possible to limit the attack surface of the attachments so that software developers can better focus their efforts on the limited attack surface of the limited set of displayable formats in order to prevent hackers or creators of malware from attacking messages by including malware within attachments. In one embodiment, software developers can focus their efforts by using fuzzing techniques to test and revise the rendering and transcoding operations to minimize failures of the rendering and transcoding operations and to increase the chances of the rejection of malware or poorly coded text. These fuzzing techniques can include operations in which random data is provided to the first set of software to test the first set of software to determine whether the first set of software can successfully render the random data or otherwise successfully test the renderability of the data. The software developer can debug failures of the first set of software for given types of random data to improve the operation of the first set of software to avoid failures of the first set of software based upon failures which occurred when the random data was presented for processing to the first set of software. In one embodiment, operations 501-515 can be performed as background operations and can be performed without the messaging application being launched or executing.

In one embodiment, an optional operation 517 can be performed. In operation 517, a representation of the rendered attachment can be displayed in a notification about the message. This notification may be displayed in a home screen or other screen of the device to alert the user that a message has been received. In one embodiment, for example, the notification may be displayed in a home screen such as a Springboard screen in the iOS operating system of Apple Inc. of Cupertino Calif. In one embodiment, the representation which is displayed is a reduced resolution (and smaller version) of the attachment.

In operation 519, the messaging application, when launched, can cause the verification of the format of the saved attachment. Operation 519 in one embodiment is optional and can be used to prevent the use of a rendered attachment when the rendered attachment may fail the verification in operation 519. Operation 519 provides an additional level of security by verifying the format of the rendered attachment is in the limited set of displayable formats allowed by the messaging application. In one embodiment, if the messaging application successfully verifies that the format of the rendered attachment is in one of the limited set of displayable formats, then operation 521 can follow in which the messaging application, once it has been launched, causes the display of the attachment in a message transcript of the conversation. In one embodiment, the second set of software can use the saved attachment which was saved in operation 515 to display the attachment as part of operation 521; in an alternative embodiment, the second set of software can render the attachment and cause it to be displayed.

Figure 7:
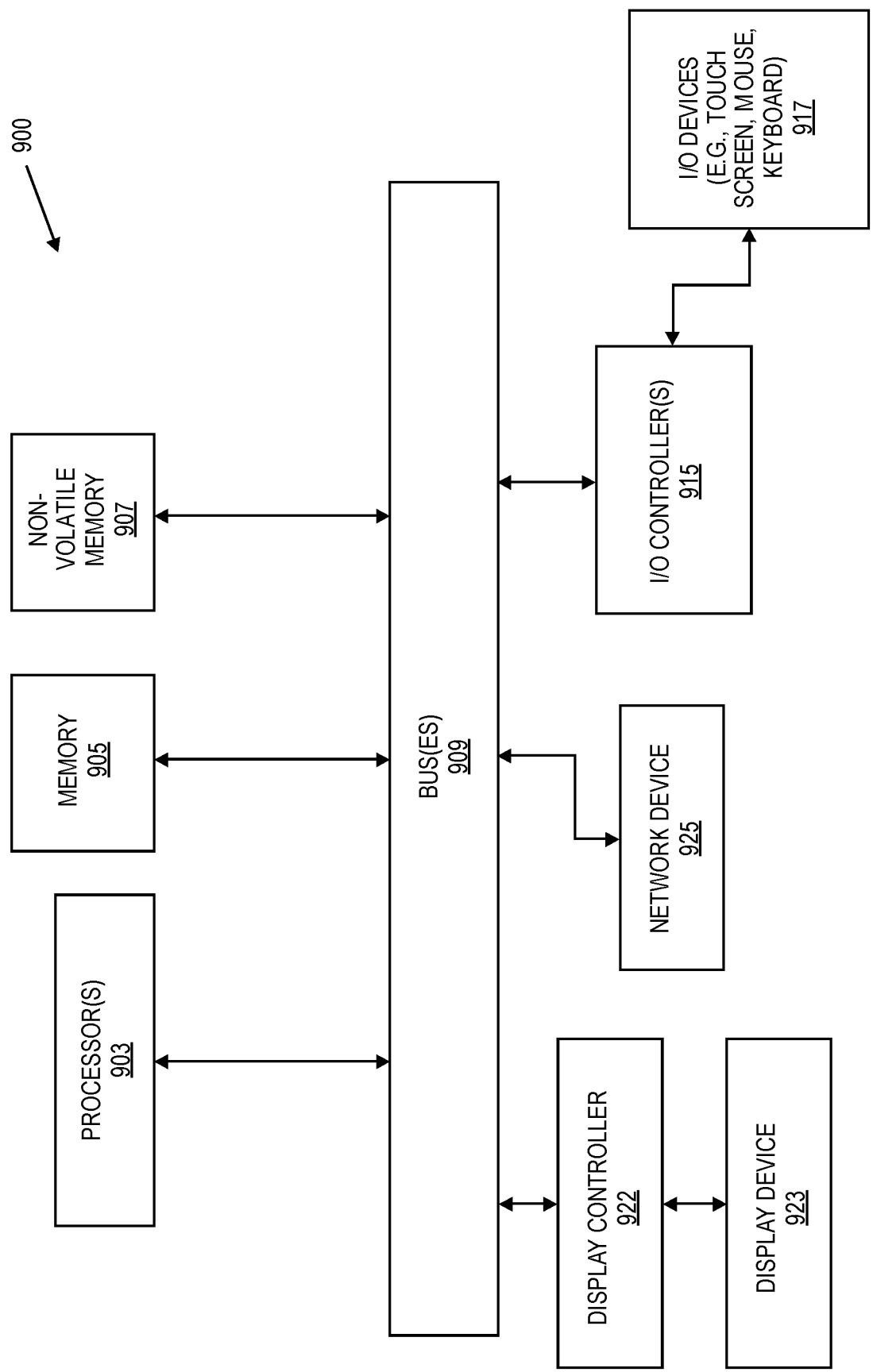
FIG. 7 is an example of a data processing system which can be used to implement the one or more embodiments described herein.

FIG. 7 is a block diagram of a data processing system 900 according to an embodiment. Note that while FIG. 7 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown can also be used within the various embodiments.

The data processing system 900 includes one or more bus(es) 909 that serve to interconnect the various components of the system. One or more processor(s) 903 are coupled to the one or more bus(es) 909 as is known in the art. Memory 905 may be volatile DRAM or non-volatile RAM, such as NOR flash memory or other types of high-speed, non-volatile, execute-in-place memory. This memory can be coupled to the one or more bus(es) 909 using techniques known in the art. The data processing system 900 can also include explicitly non-volatile memory 907, such as data storage devices including one or more hard disk drives, flash memory devices or other types of memory systems that maintain data after power is removed from the system. The non-volatile memory 907 and the memory 905 can each couple to the one or more bus(es) 909 using known interfaces and connection techniques. A display controller 922 can couple to the one or more bus(es) 909 to receive display data, which can be displayed on a display device 923. In one embodiment the display device 923 includes an integrated touch input to provide a touch screen.

The data processing system 900 can also include one or more input/output (I/O) controllers 915 which provide interfaces for one or more I/O devices, such as one or more mice, touch screens, touch pads, and other input devices including those known in the art and output devices (e.g. speakers). The input/output devices 917 are coupled through one or more I/O controllers 915 as is known in the art.

While the data processing system 900 illustrates the memory 905 and non-volatile memory 907 as coupled to the one or more buses directly, in one embodiment the non-volatile memory 907 can be remote from the data processing system 900, such as in a network storage device which is coupled to the data processing system through a network interface such as a modem, wireless LAN, or Ethernet interface. The bus(es) 909 can be connected to each other through various bridges, controllers and/or adapters as is well known in the art. In one embodiment the I/O controller 915 includes one or more of a USB (Universal Serial Bus) adapter for controlling USB peripherals or a Thunderbolt controller for controlling Thunderbolt peripherals. In one embodiment, one or more network device(s) 925 can be coupled to the bus(es) 909. The network device(s) 925 can be wired network devices (e.g., Ethernet) or wireless network devices (e.g., WI-FI, Bluetooth).

It will be apparent from this description that embodiments and aspects of the present invention may be embodied, at least in part, in software. That is, the techniques and methods may be carried out in a data processing system or set of data processing systems in response to the processors executing a sequence of instructions stored in a storage medium, such as a non-transitory machine readable storage media, such as volatile DRAM or nonvolatile flash memory. In various embodiments, hardwired circuitry may be used in combination with software instructions to implement the embodiments described herein. Thus the techniques and methods are not limited to any specific combination of hardware circuitry and software, or to any particular source for the instructions executed by the one or more data processing systems.

As described above, one aspect of the present technology is the gathering and use of data available from various sources to improve the delivery to users of messages or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the delivery and/or rendering of messages. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the message delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, messages can be rendered and delivered to users based on non-personal information data or a bare minimum amount of personal information, such as the content being requested by the device associated with a user, other non-personal information available to the delivery services, or publicly available information.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:
    receiving, at a device that includes a messaging application, a message;
    executing a first set of software, on the device, to process the message, the first set of software configured to test an ability to render the message into displayable content;
    determining whether the first set of software has successfully tested the ability to render the message into displayable content;
    executing, when the messaging application is executing, a second set of software, on the device, that operates with the messaging application to display the message in response to determining that the first set of software has successfully tested the ability to render the message into displayable content; and
    wherein the messaging application executes in a first sandbox and has access entitlement to all conversations and has network access entitlement and camera access entitlement and file access entitlement and the second set of software executes in a second sandbox which is different than the first sandbox and has fewer entitlements than the messaging application and has access entitlement to the currently opened conversation and not to other conversations.

2. The medium as in claim 1 wherein the first set of software and the second set of software have the same functionality and perform the same operations.

3. The medium as in claim 1 wherein the first set of software and the second set of software are two instances of the same computer program code.

4. The medium as in claim 1 wherein the second set of software executes while the messaging application is displaying one or more messages in a conversation within a message transcript and wherein the second set of software renders the message.

5. The medium as in claim 4 wherein output from the first set of software is not displayed.

6. The medium as in claim 1 wherein the first set of software runs in a first sandbox and the second set of software runs in a second sandbox, and wherein the first sandbox and the second sandbox are different.

7. The medium as in claim 6 wherein the test includes making application programming interface calls to graphics software to draw one or more portions of the message for display in a displayable format in containers in a message transcript of a conversation.

8. The medium as in claim 1 wherein the first set of software, when executing to process the message, also attempts to parse the message into a plurality of portions and wherein a processing or scheduling priority of the first set of software is boosted, from a first level to a second level that has a higher priority than the first level, when a number of messages waiting to be processed by the first set of software exceeds a threshold value or when a time period between a current time and a last used time of the messaging application exceeds a specified period of time.

9. The medium as in claim 8 wherein the message is decrypted before being processed by the first set of software and before being processed by the second set of software.

10. The medium as in claim 1 wherein the first set of software is a working daemon that is managed by a managing daemon, and the managing daemon monitors status of the working daemon and relaunches the working daemon if the working daemon crashes.

11. The medium as in claim 10 wherein the first set of software has not successfully tested its ability to render the message when (1) the working daemon crashes while attempting to test rendering of the message; or (2) one or more exceptions are thrown by the working daemon; or (3) the test is not completed within a period of time.

12. The medium as in claim 10 wherein the managing daemon has more entitlements than the working daemon, and the working daemon does not have a network access entitlement or a file access entitlement.

13. The medium as in claim 10 wherein the managing daemon causes a successfully tested message to be saved in a messages database and does not save a message that was not successfully tested.

14. The medium as in claim 1 wherein the messaging application is one of an email application or a text messaging application or a web browser application.

15. A non-transitory machine readable medium storing executable program instructions which when executed by a data processing system cause the data processing system to perform a method comprising:
    receiving, at a device that includes a messaging application, an attachment associated with a message;
    executing a first set of software, on the device, to process the attachment, the first set of software configured to test an ability to render the attachment into displayable format;
    determining whether the first set of software has successfully tested the ability to render the attachment into displayable format;
    executing, when the messaging application is executing and is displaying one or more messages in a conversation, a second set of software, on the device, to display the attachment in response to determining that the first set of software has successfully tested the ability to render the attachment into displayable format; and wherein the messaging application executes in a first sandbox and has access entitlement to all attachments and has network access entitlement and camera access entitlement and file access entitlement, and the second set of software executes in a second sandbox which is different than the first sandbox and has fewer entitlements than the messaging application and has access entitlement to the attachment associated with the message and not other attachments.

16. The medium as in claim 15 wherein the method further comprises:

saving a successfully tested attachment that was rendered by the first set of software for use by the second set of software to display the attachment.

17. The medium as in claim 16 wherein a representation of the saved attachment is used in notifications about receipt of the message.

18. The medium as in claim 15 wherein the second set of software renders the attachment, and the second set of software has the same functionality and operations as the first set of software.

19. The medium as in claim 15 wherein the first set of software transcodes the attachment into a limited set of displayable formats from a set of receivable formats.

20. The medium as in claim 19 wherein the limited set of displayable formats includes one or more of an ASTC format or CPBitmap format and the set of receivable formats includes more formats.

21. The medium as in claim 19 wherein the second set of software causes a verification that the format of the attachment is one of the limited set of displayable formats.

22. The medium as in claim 15 wherein the second set of software displays a generic icon in place of the attachment when the first set of software does not successfully test the ability to render the attachment.

23. The medium as in claim 15 wherein the first set of software runs in a first sandbox and the second set of software runs in a second sandbox, and wherein the first sandbox and the second sandbox are different.

24. The medium as in claim 23 wherein the test by the first set of software includes making application programming interface calls to graphics software to draw one or more portions of the attachment in the displayable format and the second set of software displays the attachment in a message transcript of a conversation.

25. The medium as in claim 15 wherein the attachment is decrypted before being processed by the first set of software.

26. The medium as in claim 15 wherein the first set of software is a working daemon that is managed by a managing daemon, and the managing daemon monitors status of the working daemon and relaunches the working daemon if the working daemon crashes.

27. The medium as in claim 26 wherein the first set of software has not successfully tested its ability to render the attachment when (1) the working daemon crashes while attempting to test rendering of the attachment; or (2) one or more exceptions are thrown by the working daemon; or (3) the test is not completed within a time period.

28. The medium as in claim 26 wherein the managing daemon has more entitlements than the working daemon, and the working daemon does not have a network access entitlement or a file access entitlement.

* * * * *